(12) United States Patent
Mathew (10) Patent No.: US 7,210,846 B2
(45) Date of Patent: May 1, 2007

(54) THERMOSTAT HOUSING ASSEMBLY

(75) Inventor: Boney A. Mathew, Clarkston, MI (US)

(73) Assignee: Mathson Industries, Troy, MI (US)

( * ) Notice: Subject to any disclaimer, the term of this patent is extended or adjusted under 35 U.S.C. 154(b) by 149 days.

(21) Appl. No.: 11/190,554

(22) Filed: Jul. 27, 2005

(65) Prior Publication Data

US 2006/0023769 A1 Feb. 2, 2006

Related U.S. Application Data (60) Provisional application No. 60/591,684, filed on Jul. 28, 2004.

(51) Int. Cl.
*G01K 1/08* (2006.01)
*G01K 1/14* (2006.01)
*G01K 13/00* (2006.01)

(52) U.S. Cl. .................. 374/208; 374/141; 236/34; 236/34.5

(58) Field of Classification Search ............. 374/208, 374/141; 236/34, 34.5, 93 R, 99 R
See application file for complete search history.

(56) References Cited

U.S. PATENT DOCUMENTS

| | | | | | |
|---|---|---|---|---|---|
| 1,806,072 | A | * | 5/1931 | Levy | ............ 236/34 |
| 2,833,478 | A | | 5/1958 | Middleton | |
| 3,154,249 | A | * | 10/1964 | Saliaris | ............ 236/34 |
| 3,215,873 | A | * | 11/1965 | Kruger et al. | ........ 310/68 R |
| 3,262,314 | A | * | 7/1966 | Gregg | ............ 374/114 |
| 3,701,068 | A | * | 10/1972 | Johnsen | ............ 337/102 |
| 3,893,057 | A | * | 7/1975 | Beunk et al. | ............ 337/380 |
| 4,103,271 | A | * | 7/1978 | Taylor et al. | ............ 337/372 |
| 4,269,350 | A | | 5/1981 | Beck | |
| 4,296,721 | A | | 10/1981 | Steele, Jr. | |
| 4,392,608 | A | * | 7/1983 | Blades | ............ 236/48 R |
| 4,514,717 | A | * | 4/1985 | Doherty, Jr. | ............ 337/365 |
| 4,562,953 | A | * | 1/1986 | Duprez et al. | ............ 236/34.5 |
| 4,643,352 | A | | 2/1987 | Detweller | |
| 4,696,579 | A | * | 9/1987 | De Filippis et al. | ........ 374/187 |
| 4,782,318 | A | * | 11/1988 | Boulanger | ............ 337/380 |
| 4,978,060 | A | * | 12/1990 | Stahly | ............ 236/34.5 |
| 4,982,704 | A | | 1/1991 | Sliger | |
| 5,018,664 | A | | 5/1991 | Butler | |
| 5,669,363 | A | | 9/1997 | Francis | |

(Continued)

FOREIGN PATENT DOCUMENTS

DE 199 01 850 A1 7/2000

*Primary Examiner*—Gail Verbitsky
(74) *Attorney, Agent, or Firm*—Dickinson Wright PLLC (57) ABSTRACT

A thermostat housing assembly (10, 100) includes a housing (12, 102) having a flange (16, 106) for mounting the housing (12, 102) on a support structure and a tubular spout (18, 108) extending from the flange (16, 106) and defining a passageway (20, 110). The flange (16, 106) presents a mounting face (26, 112) defining a seal groove (28, 114) extending annularly about the flange (16, 106) opening and having opposing side walls (32, 34, 116, 118). A seal (36, 124) is disposed in the seal groove (28, 114) for sealing the flange (16, 106) to the support structure. The seal (36, 124) has annular rings (42, 44, 126, 128). The opposing side walls (32, 34, 116, 118) include opposing channels (38, 40, 120, 122) defined therein to mechanically engage the annular rings (42, 44, 126, 128) extending radially into the opposing channels (38, 40, 120, 122) for retaining the seal (36, 124) in the seal groove (28, 114).

14 Claims, 6 Drawing Sheets

U.S. PATENT DOCUMENTS

| | | |
|---|---|---|
| 6,138,617 A | 10/2000 | Kuze |
| 6,679,431 B1 * | 1/2004 | Mathew et al. ............ 236/34.5 |
| 6,772,959 B2 * | 8/2004 | Cardinali Ieda ........... 236/34.5 |
| 6,820,817 B2 * | 11/2004 | Leu ........................... 236/34.5 |
| 6,942,221 B2 * | 9/2005 | Keeley et al. .............. 277/608 |
| 2004/0004132 A1 | 1/2004 | Ieda |
| 2004/0007629 A1 | 1/2004 | Ieda |

* cited by examiner

THERMOSTAT HOUSING ASSEMBLY

CROSS REFERENCE TO RELATED APPLICATION

This application claims the benefit of application Ser. No. on 60/591,684 filed Jul. 28, 2004.

BACKGROUND OF THE INVENTION

1. Field of the Invention

This subject invention relates to thermostatic water valves for use in internal combustion engine cooling systems and particularly to a thermostat housing assembly for mounting on an engine to control coolant flow.

2. Description of the Prior Art

During operation of a cold engine it is desirable to prevent cooling water from flowing through the radiator in order to reduce the time required for the engine to reach an optimal running temperature, which is achieved by diverting cooling water from the discharge side of the water pump back to the engine block through a bypass conduit and blocking its return path to the radiator.

A conventional thermostat for an engine includes a valve biased to a closed position by a spring and includes an expandable system that expands in response to heat to open the valve against the spring. The thermostat includes a metal carrier that is disposed in the housing before the housing is mounted into sealed relationship with the engine. The thermostat is often placed in the housing before the housing is mounted on the engine.

Various prior art designs of thermostat assemblies are taught by U.S. Pat. No. 4,196,847 to Gobien; U.S. Pat. No. 4,280,655 to Duprez et al.; U.S. Pat. No. 4,456,167 to Buter; U.S. Pat. No. 5,163,613 to Ragan, and U.S. Pat. No. 5,669,363 to Francis and are widely used in an automotive industry. It is often a problem to obtain adequate sealing and to retain the thermostat valve and/or the seals in position during shipment and handling of the assembly before mounting on the support structure of an engine.

SUMMARY OF THE INVENTION AND ADVANTAGES

A thermostat housing assembly of the present invention includes a housing having a flange for mounting the housing on a support structure and a tubular spout extending from the flange and defining a passageway extending from a spout opening in the tubular spout to a flange opening in the flange for fluid to flow therethrough. The flange presents a mounting face for engaging the support structure. The flange includes a seal groove extending annularly about the flange opening. The seal groove presents a U-shaped cross section with a bottom and opposing side walls. A seal is disposed in the seal groove for sealing the flange to the support structure. The assembly is characterized by opposing channels defined in the opposing side walls and extending annularly thereabout and the seal having annular rings extending radially into the opposing channels for retaining the seal in the seal groove.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Referring to the Figures, wherein like numerals indicate like or corresponding parts throughout the several views, a thermostat housing assembly is shown generally at 10. The thermostat housing assembly 10 includes a housing, generally indicated at 12, and a thermostat or flow control valve, generally indicated at 14.

Figure 1:
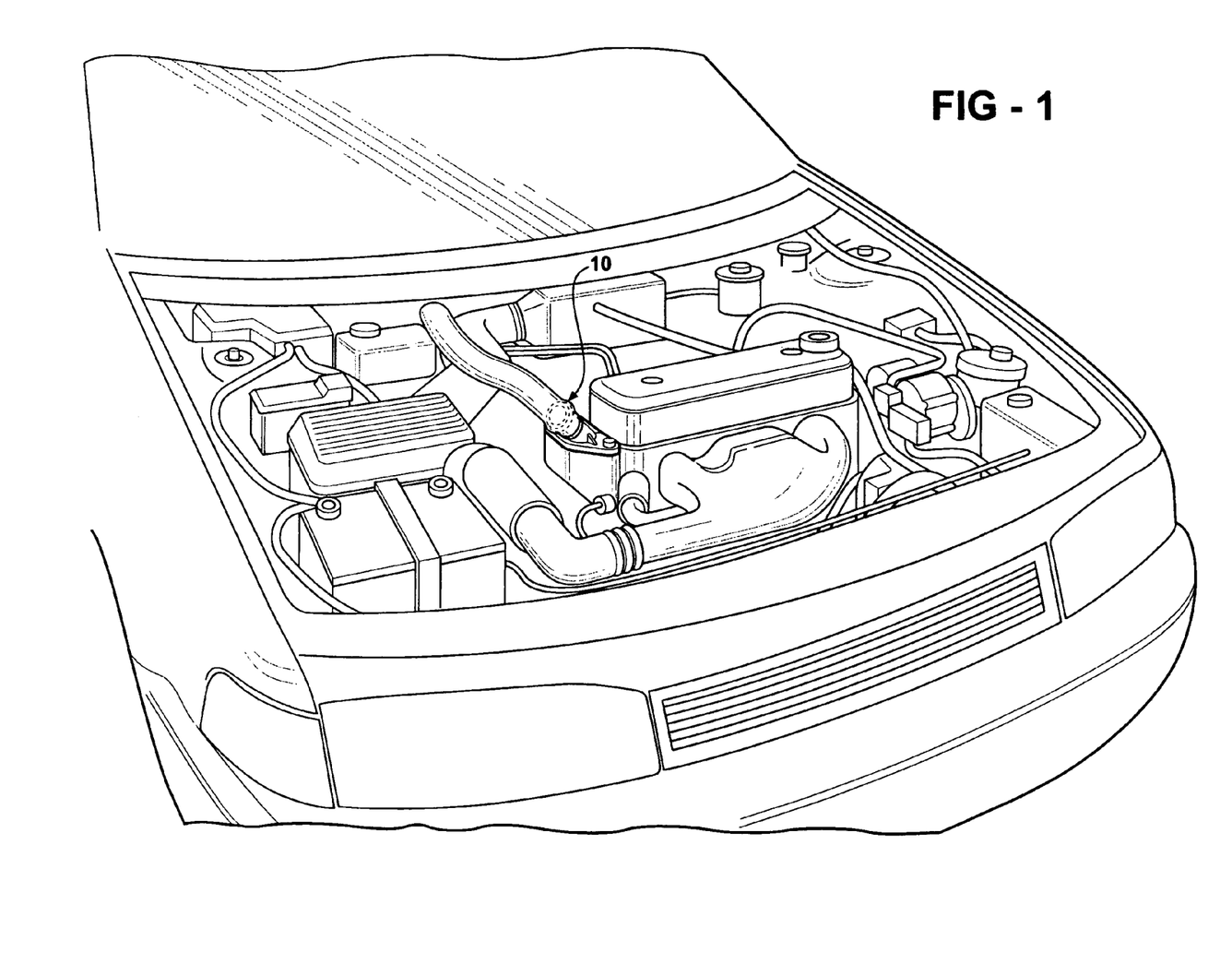
FIG. 1 is a perspective view showing an automotive engine to which the subject invention is mounted.

The housing 12 has a flange 16 for mounting the housing 12 on a support structure, such as, for example, an engine of a vehicle, as shown in FIG. 1, and a tubular spout 18 extending from the flange 16 and defining a passageway 20 extending from a spout opening 22 in the tubular spout 18 to a flange opening in the flange 16 for fluid to flow therethrough.

The flange 16 presents a mounting face, generally indicated at 26, for engaging the support structure 16. The mounting face 26 includes a seal groove, generally indicated at 28, which extends annularly about the flange opening. The seal groove 28 presents a U-shaped cross section defining a bottom extending to opposing side walls. The opposing side walls of the seal groove 28 are further defined by an inner side wall 32 being nearest to the passageway 20 of the tubular spout 18 and an outer side wall 34. The inner side wall 32 is shorter in length than the outer side wall 34. The inner and outer side walls 32, 34 present opposing channels 38, 40 defined therein and extending annularly thereabout.

Figure 2:
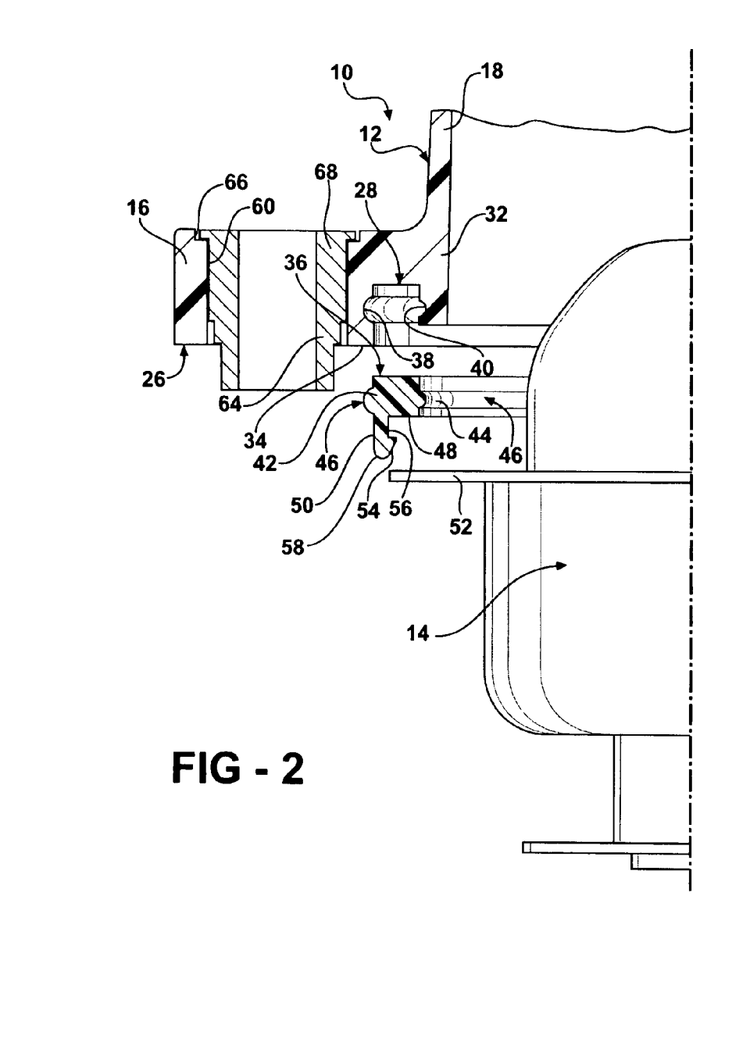
FIG. 2 an enlarged partial front view shown in cross section of the left hand portion of the subject invention.
Figure 3:
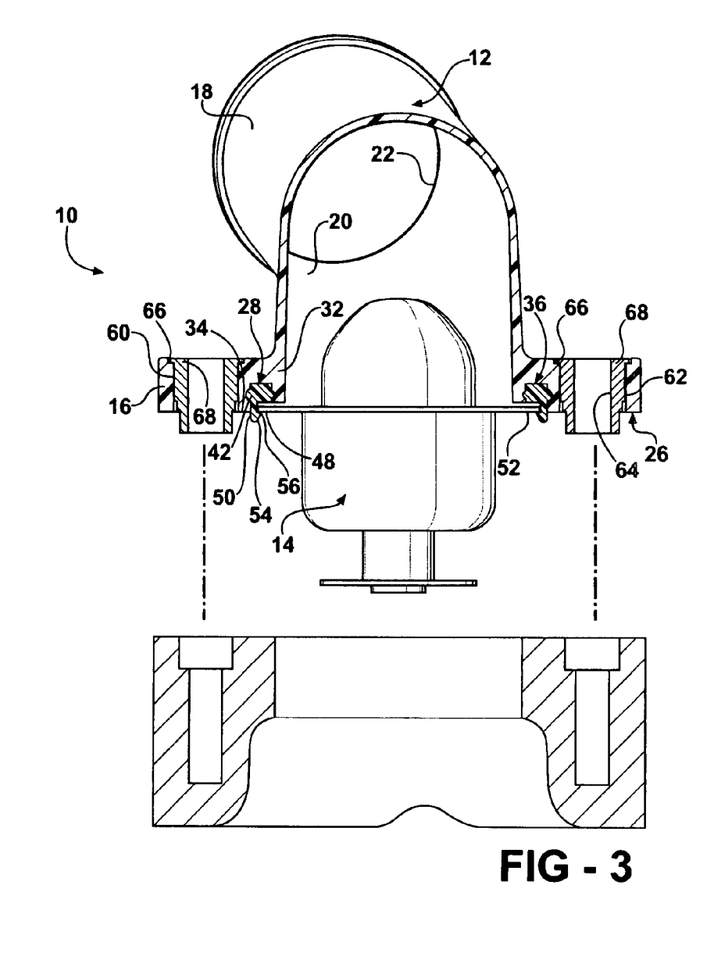
FIG. 3 is an exploded perspective view of the subject invention and shown in cross section.
Figure 4:
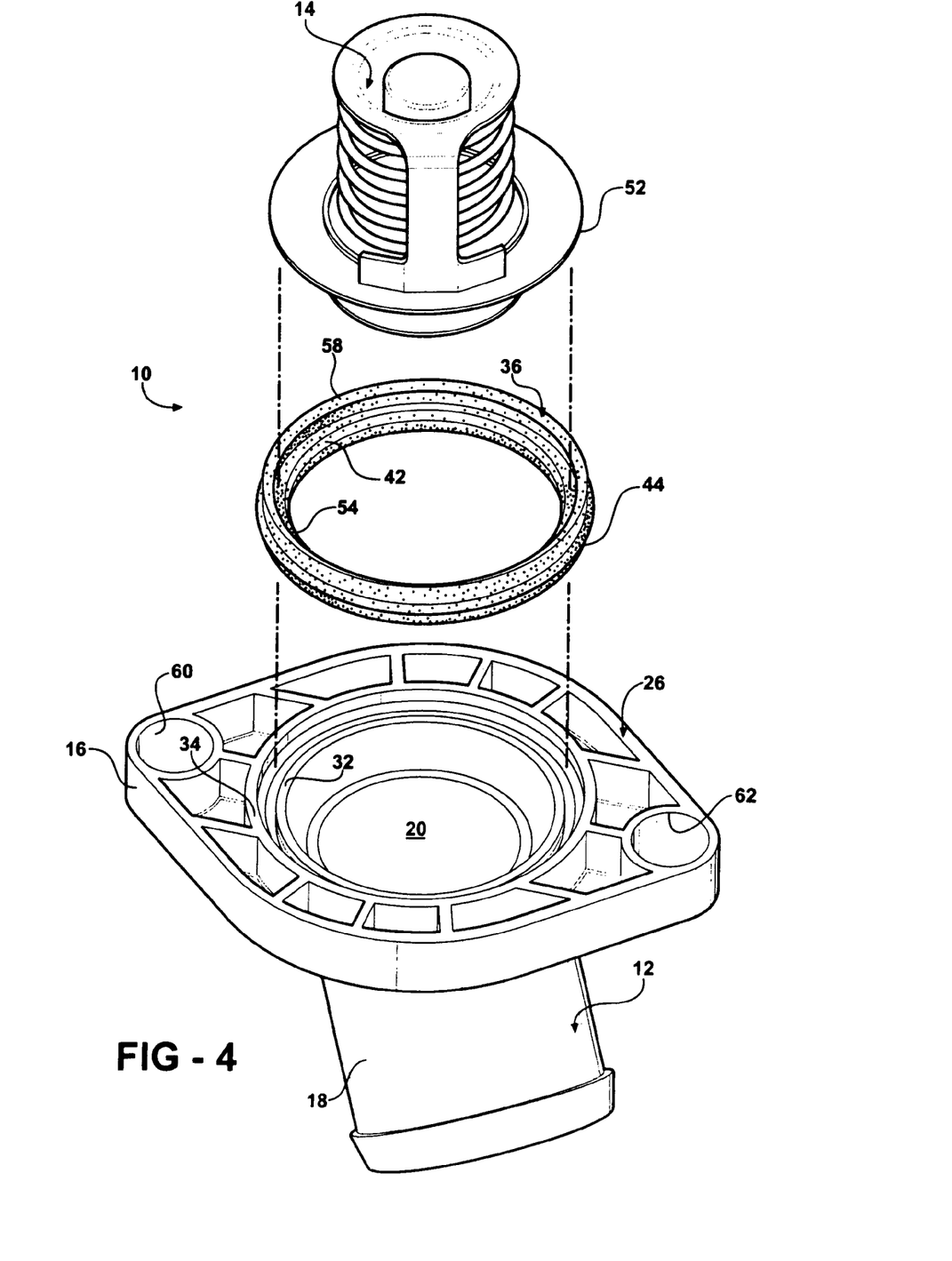
FIG. 4 is an exploded perspective view showing the subject invention.

A seal, generally indicated 36, is disposed in the seal groove 28 for sealing the flange 16 to the support structure. As best illustrated in FIG. 2, the seal 36 presents annular rings 42, 44 extending radially into the opposing channels 38, 40 for retaining the seal 36 in the seal groove 28. Each annular ring 42, 44 is integral with the seal 36 presenting a convex surface, generally indicated at 46. The convex surfaces 46 have different radii, wherein one of the convex surfaces 46 of the annular ring 42 has a larger radius than the other radius of the other convex surface 46 of the other annular ring 44. The seal 36 presents a top surface 48 disposed above the inner side wall 32. An extension 50 of the seal 36 extends upwardly from the top surface 48 along the outer side wall 34 for engaging the periphery 52 of the thermostat 14. The extension 50 defines a hook 54 presenting an undercut 56. The hook 54 overlying the top surface 48 of the seal 36 for receiving and holding the periphery 52 of the thermostat 14. The hook 54 extends upwardly to a top face 58 defined therein and extending parallel to the mounting face 26 for sealing engagement with the support structure. As the periphery 52 of the thermostat 14 is disposed between the hook 54 and the top surface 48, the extension 50 provides a resilient barrier between the periphery 52 and the outer side wall 34 of the housing 12.

The flange 16 has at least two holes 60, 62 extending therethrough for receiving fasteners, e.g., bolts, (not shown) for mounting the housing 12 on the support structure. A bushing 64 is disposed in each of the holes 60, 62. Each of the holes 60, 62 further includes a countersunk portion 66 extending into the mounting face 26 of the flange 16. Each of the bushings 64 includes a head 68 disposed in the countersunk portion 66 of one of the holes 60, 62.

Figure 5:
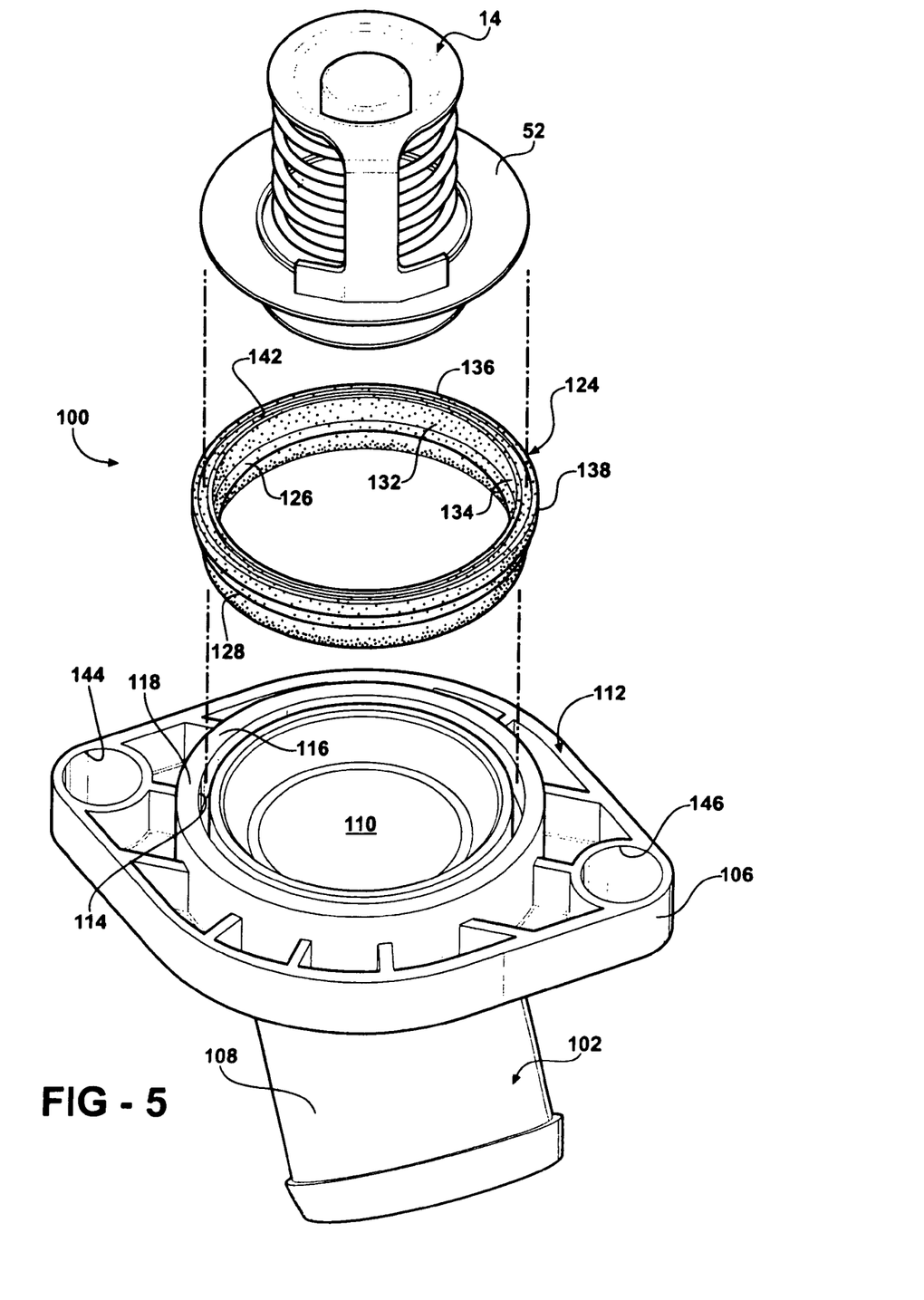
FIG. 5 is an exploded perspective view of an alternative embodiment of the subject invention.
Figure 6:
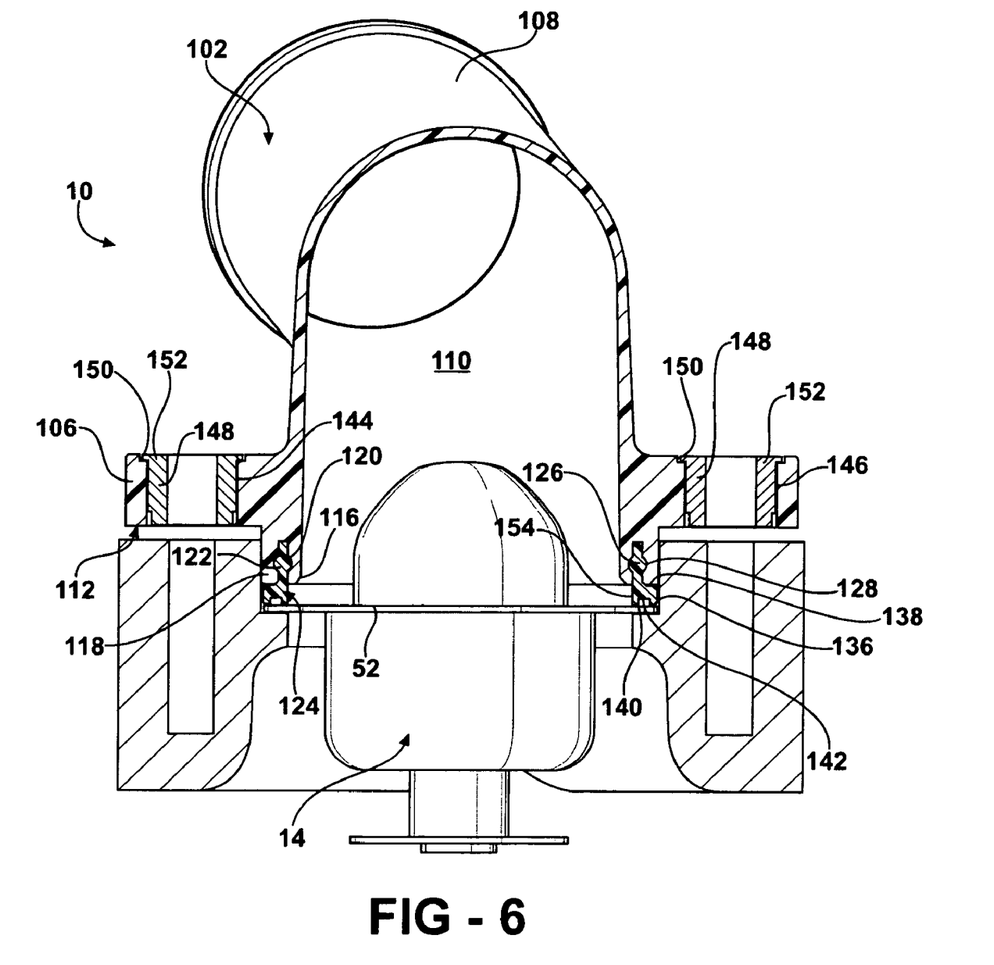
FIG. 6 is a perspective view of the alternative embodiment of the subject invention of FIG. 5 and shown in cross section.

As illustrated in FIGS. 5 and 6, an alternative embodiment of the thermostat housing assembly is generally shown at 100. A housing, generally indicated at 102, has a flange 106 for mounting the housing 102 on the support structure, and a tubular spout 108 extending from the flange 106 and defining a passageway 110 extending from a spout opening 112 in the tubular spout 108 to a flange opening in the flange 106 for fluid to flow therethrough. The flange 106 presents a mounting face, generally indicated at 112, for engaging the support structure.

The mounting face 112 includes a seal groove 114, which extends annularly about the flange 106 opening. The seal groove 114 presents a U-shaped cross section defining a bottom extending to opposing side walls. The opposing side walls of the seal groove 114 are further defined by an inner side wall 116 being nearest to the passageway 110 of the tubular spout 108 and an outer side wall 118. The inner side wall 116 and the outer side wall 118 are equal in length. The inner side wall 116 and the outer side wall 118 present opposing channels 120, 122 defined therein and extending annularly thereabout. A seal, generally indicated at 124, is disposed in the seal groove 114 for sealing the flange 106 to the support structure. The seal 124 presents annular rings 126, 128 extending radially into the opposing channels 120, 122 for retaining the seal 124 in the seal groove 114. Each annular ring 126, 128 is integral with the seal 124 presenting a convex surface, generally indicated at 130. The convex surfaces 130 have equal radii. The seal 124 presents an annular crown 132 disposed above the inner and outer side walls 116, 118. The annular crown 132 presents in an inner periphery 134 and an outer periphery 136, a bottom surface 138 engaging the outer side wall 118, and a top surface 140 defining an annular groove 142.

The flange 106 has at least two holes 144, 146 extending therethrough for receiving fasteners, e.g., bolts, (not shown) for mounting the housing 102 on the support structure. A bushing 148 is disposed in each of the holes 144, 146. Each of the holes 144, 146 further includes a countersunk portion 150 extending into the mounting face 112 of the flange 106. Each of the bushings 148 includes a head 152 disposed in the countersunk portion 150 of one of the holes 144, 146.

Figure 7:
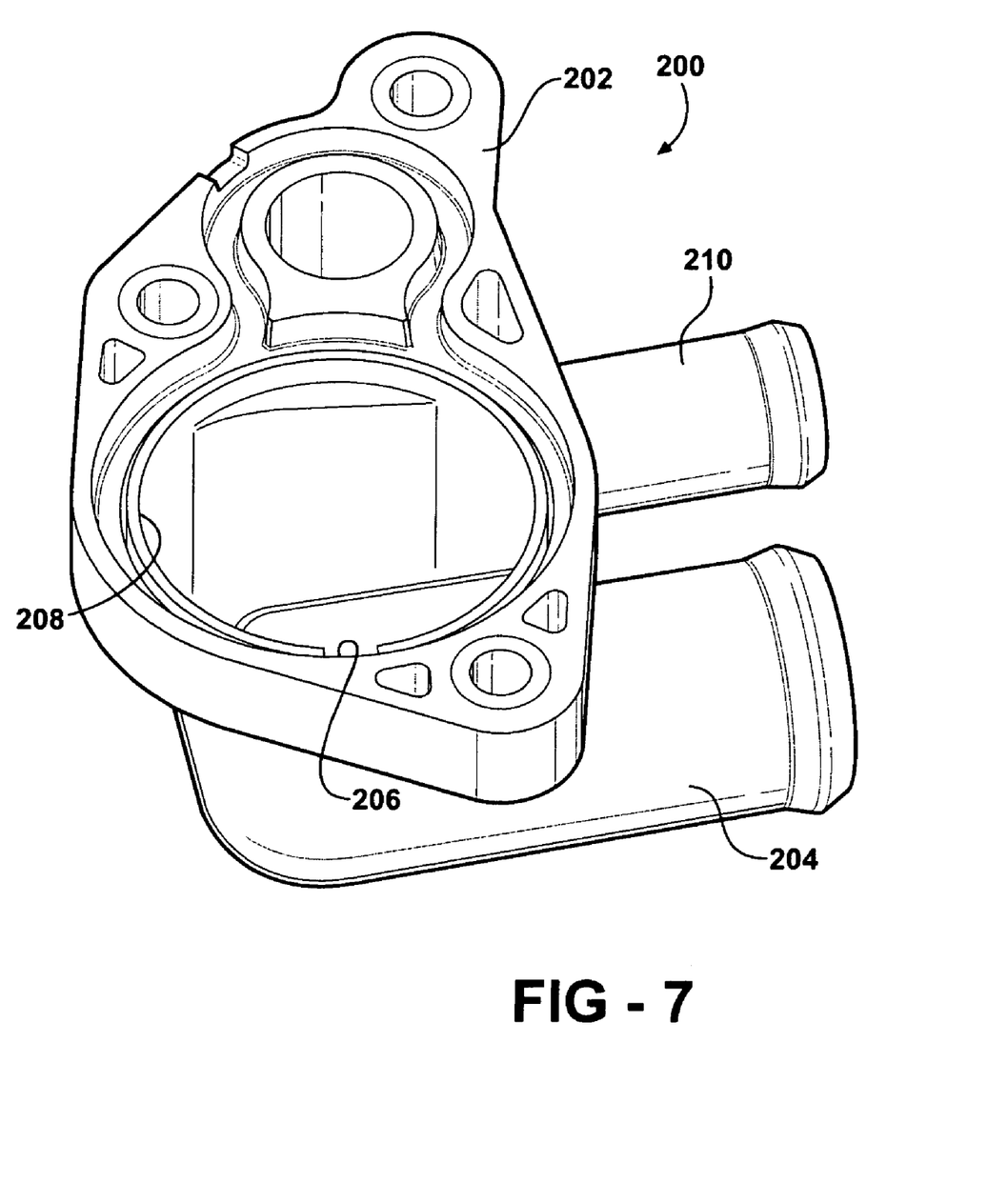
FIG. 7 is a perspective view of an alternative embodiment of a housing of the subject invention.

FIG. 7 illustrates still another alternative embodiment of the housing, generally shown at 200. In this embodiment, the housing 200 has a flange 202 for mounting the housing 200 on the support structure. The housing 200 includes a main tubular spout 204 extending from the flange 202 and defining a passageway 206 extending from a spout opening (not shown) in the tubular spout 204 to a flange opening 208 in the flange 202 for fluid to flow therethrough. The housing 200 includes a secondary tubular spout 210 extending from the flange 202 and defining a second passageway (not shown) of the second tubular spout 210 extending from a second spout opening (not shown) in the second tubular spout 210 to the opening in the flange 202 for fluid to flow therethrough. Those skilled in the art will appreciate that the housing 200 may adaptable any structure of the aforementioned seals 36, 126 and the seal grooves 28, 114 to engage thermostat valve of different designs.

The aforementioned thermoplastic housings 12 and 102 and the seals 36 and 124 can be molded using a two shot and/or insert molding and allows a removable thermostat. The housings 12 and 102 can consist of structural thermoplastic polymeric material such as PPA, Nylon, PPS, or PBT. The seals 36 and 124 may be of thermoplastic elastomers such as Polypropylene & EPDM based TPE, or fluoropolymers such as THV, FEP, PFA, EFTE, VFEP, etc., or one which is polyester based. One could also use a thermostat elastomer such as silicone. The invention provides a single seal 36 and 124 that seals the housings 12 and 102 as well as the periphery of the thermostat, thereby preventing flow through the tubular spout 18 prior to the opening of the valve, and preventing coolant from leaking. The seal 36 and 124 also allows the thermostat 14 to be removed from the housing 12 and 102, and allows replacement of the thermostat 14 without replacing the seal 36 and 124.

Obviously, many modifications and variations of the present invention are possible in light of the above teachings. The invention may be practiced otherwise than as specifically described within the scope of the appended claims, wherein that which is prior art is antecedent to the novelty set forth in the "characterized by" clause. The novelty is meant to be particularly and distinctly recited in the "characterized by" clause whereas the antecedent recitations merely set forth the old and well-known combination in which the invention resides. These antecedent recitations should be interpreted to cover any combination in which the incentive novelty exercises its utility. In addition, the reference numerals in the claims are merely for convenience and are not to be read in any way as limiting.

What is claimed is:

1. A thermostat housing assembly (10, 100) comprising;
    a housing (12, 102) having a flange (16, 106) for mounting said housing (12, 102) on a support structure and a tubular spout (18, 108) extending from said flange (16, 106) and defining a passageway (20,110) extending from a spout opening (22, 112) in said tubular spout (18, 108) to a flange opening (24) in said flange (16, 106) for fluid to flow therethrough,
    said flange (16, 106) presenting a mounting face (26, 112) for engaging the support structure and including a seal groove (28, 114) extending annularly about said flange (16, 106) opening and having a U-shaped cross section with a bottom (30, 115) and opposing side walls (32, 34, 116, 118),
    a seal (36, 124) disposed in said seal groove (28, 114) for sealing said flange (16, 106) to the support structure, and
    said assembly (10, 100) characterized by opposing channels (38, 40, 120, 122) defined in said opposing side walls (32, 34, 116, 118) and extending annularly thereabout and said seal (36, 124) having annular rings (42, 44, 126, 128) extending radially into said opposing channels (38, 40, 120, 122) for retaining said seal (36, 124) in said seal groove (28, 114).

2. An assembly (10, 100) as set forth in claim 1 wherein each of said annular rings (42, 44, 126, 128) is integral with said seal (36, 124).

3. An assembly (10, 100) as set forth in claim 2 wherein each of said annular rings (42, 44, 126, 128) presents a convex surface (46, 130).

4. An assembly (10) as set forth in claim 3 wherein said convex surfaces (46) have different radii.

5. An assembly (10) as set forth in claim 4 wherein one of said convex surfaces (46) has a larger radius than the other radius of the convex surface.

6. An assembly (10) as set forth in claim 2 wherein one of said opposing side walls (32, 34) of said seal groove (28) is an inner side wall nearest to said passageway (20) of said tubular spout (18) and is shorter in length than the outer of said opposing side walls (32, 34).

7. An assembly (10) as set forth in claim 6 wherein said seal (36) presents a top surface (48) disposed above said inner side wall (32) and an extension (50) extending upwardly from said top surface (48) along said outer side wall (34) for engaging the periphery (52) of the thermostat (14).

8. An assembly (10) as set forth in claim 7 wherein said extension (50) defines a hook (54) presenting an undercut (56) with said hook (54) overlying said top surface (48) of said seal (36) for receiving and holding the periphery (52) of the thermostat (14).

9. An assembly (10) as set forth in claim 8 wherein said hook (54) extends upwardly to a top face (58) parallel to said mounting face (26) for sealing engagement with the support structure with said top face (58) presenting an annular groove (59) defined therein.

10. An assembly (100) as set forth in claim 3 wherein said seal (124) presents an annular crown (132) is disposed above said inner side wall (116) and said outer side walls (118) with said annular crown (132) presenting in an inner periphery (134) and an outer periphery (136), a bottom surface (138) engaging said outer side wall (118), and a top surface (140) defining an annular groove (142).

11. An assembly (10, 100) as set forth in claim 1 wherein said flange (16, 106) has at least two holes (60, 62, 144, 146) extending therethrough for receiving fasteners for mounting said housing (12, 102) on the support structure and including a bushing (64, 148) disposed in each of said holes (60, 62, 144, 146).

12. An assembly (10, 100) as set forth in claim 11 wherein each of said holes (60, 62, 144, 146) includes a countersunk portion (66, 150) extending into said mounting face (26, 112) of said flange (16, 106) and each of said bushings (64, 148) includes a head (68, 152) disposed in said countersunk portion (66, 150) of one of said holes (60, 62, 144, 146).

13. An assembly (10, 100) as set forth in claim 1 wherein said housing (12, 102) and said seal (36, 124) are formed from a polymeric material.

14. An assembly (10, 100) as set forth in claim 13 wherein said polymeric material of said seal (36, 124) is compressible.

* * * * *